US010938734B1

United States Patent
Nelson et al.

(10) Patent No.: US 10,938,734 B1
(45) Date of Patent: Mar. 2, 2021

(54) SCHEDULING MECHANISMS FOR END SYSTEM SUBVLS (71) Applicant: Rockwell Collins, Inc., Cedar Rapids, IA (US)

(72) Inventors: Brent J. Nelson, Marion, IA (US); David A. Miller, Swisher, IA (US); James M. Zaehring, Edmonds, WA (US); Nicholas H. Bloom, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/614,384

(22) Filed: Jun. 5, 2017

(51) Int. Cl.
H04L 12/863 (2013.01)
H04L 12/935 (2013.01)
H04L 12/853 (2013.01)
H04L 29/08 (2006.01)
H04L 12/851 (2013.01)
H04L 12/46 (2006.01)
H04L 29/06 (2006.01)
(Continued)

(52) U.S. Cl.
CPC ........ H04L 47/564 (2013.01); H04L 47/2416 (2013.01); H04L 47/6215 (2013.01); H04L 49/3027 (2013.01); H04L 67/12 (2013.01); H04L 12/4641 (2013.01); H04L 47/2441 (2013.01); H04L 49/70 (2013.01); H04L 69/26 (2013.01); H04L 2012/4028 (2013.01)

(58) Field of Classification Search
CPC ... H04L 47/2416; H04L 47/50; H04L 47/564; H04L 47/566; H04L 47/6215; H04L 67/12; H04L 2012/4028
See application file for complete search history.

(56) References Cited

U.S. PATENT DOCUMENTS 6,594,264 B1 * 7/2003 Lin ..................... H04L 12/5602
370/395.42
6,714,554 B1 * 3/2004 Jin ......................... H04L 29/06
370/412

(Continued)

FOREIGN PATENT DOCUMENTS

EP     2 629 459     8/2013

OTHER PUBLICATIONS

AFDX Workshop Avionics Databus Solutions, Oct. 2010, 55 pages.
Architecting ARINC 664, Part 7 (AFDX) Solutions, May 22, 2009, 25 pages.

Primary Examiner — Kevin C. Harper
(74) Attorney, Agent, or Firm — Suiter Swantz pc llo (57) ABSTRACT A device for avionics full-duplex switched Ethernet (AFDX) communication can include a transmit port for transmitting AFDX data and a processor. The processor can be configured to obtain AFDX data frames for transmission over a plurality of sub-virtual links (subVLs) of a virtual link (VL), and maintain, for each of the plurality of subVLs, a corresponding data queue by storing AFDX data frames associated with that subVL in the corresponding data queue. The processor can transmit the AFDX data frames from the plurality of data queues on the plurality subVLs via the transmit port according to a scheduling policy that is based on subVL prioritization. The scheduling policy that is based on subVL prioritization can include static priority (SPn) scheduling, earliest deadline first (EDF) scheduling, or least laxity first (LLF) scheduling.

17 Claims, 5 Drawing Sheets (51) Int. Cl.
*H04L 12/931* (2013.01)
*H04L 12/40* (2006.01)
*H04L 12/875* (2013.01)

(56) References Cited

U.S. PATENT DOCUMENTS

| | | | |
|---|---|---|---|
| 10,033,829 B2 * | 7/2018 | Ling | H04L 67/325 |
| 2004/0042400 A1 * | 3/2004 | Horlin | H04L 12/5601 |
| | | | 370/232 |
| 2005/0050221 A1 * | 3/2005 | Tasman | H04W 52/46 |
| | | | 709/232 |
| 2013/0208630 A1 * | 8/2013 | Bobrek | H04L 67/12 |
| | | | 370/276 |
| 2014/0324959 A1 * | 10/2014 | Hudson | H04L 47/623 |
| | | | 709/203 |

* cited by examiner

SCHEDULING MECHANISMS FOR END SYSTEM SUBVLS

BACKGROUND

Many new generations of commercial aircraft support avionics full-duplex switched Ethernet (AFDX). AFDX architecture allows for reliable full-duplex deterministic networks that can provide guaranteed bandwidth and quality of service. AFDX networks make use of virtual links (VLs) to replace physical point-to-point links. An AFDX network usually includes a plurality of end systems connected to one or more switches. End systems use time-division multiplexing to transmit data through VLs over the network. End systems assign a specific maximum bandwidth and a specific end-to-end latency for each VL. The maximum bandwidths and latencies assigned to various VLs are guaranteed or enforced by the network or respective switches. Each end system is configured to maintain and manage at least one queue for each VL handled by that end system.

Each VL can include a plurality of sub-virtual links (subVLs). The end system handling a given VL maintains and manages a separate queue for each subVL of that VL. The end system reads and transmits data frames from subVL queues of a respective VL according to a round-robin fashion. As such, the subVLs associated with a common VL would merely have equal priorities with respect to the scheduling of corresponding data frames for transmission.

SUMMARY

In one aspect, embodiments of the inventive concepts disclosed herein are directed to a device for AFDX communication. The device can include a transmit port for transmitting AFDX data and a processor. The processor can be configured to obtain AFDX data frames for transmission over a plurality of subVLs of a VL. The processor can maintain, for each of the plurality of subVLs, a corresponding data queue by storing AFDX data frames associated with that subVL in the corresponding data queue. The processor can transmit the AFDX data frames from the plurality of data queues on the plurality subVLs via the transmit port according to a scheduling policy that is based on subVL prioritization.

The scheduling policy that is based on subVL prioritization can include static priority (SPn) scheduling. The SPn scheduling can include retrieving AFDX data frames from each data queue according to a first-in-first-out (FIFO) order. The SPn scheduling can include applying round-robin scheduling among data queues with equal priorities.

The scheduling policy that is based on subVL prioritization can include earliest deadline first (EDF) scheduling. The EDF scheduling can include retrieving AFDX data frames from each data queue according to a first-in-first-out (FIFO) order.

The scheduling policy that is based on subVL prioritization can include least laxity first (LLF) scheduling. The LLF scheduling can include retrieving AFDX data frames from each data queue according to a first-in-first-out (FIFO) order.

In a further aspect, embodiments of the inventive concepts disclosed herein are directed to a method of transmission of AFDX data. The method can include a communication device obtaining AFDX data frames for transmission over a plurality of subVLs of a VL. The method can include the communication device maintaining for each of the plurality of subVLs a corresponding data queue by storing AFDX data frames associated with that subVL in the corresponding data queue. The method can include the communication device transmitting the AFDX data frames from the plurality of data queues on the plurality subVLs according to a scheduling policy that is based on subVL prioritization.

The scheduling policy that is based on subVL prioritization can include static priority (SPn) scheduling. The SPn scheduling can include retrieving AFDX data frames from each data queue according to a first-in-first-out (FIFO) order. The SPn scheduling can include applying round-robin scheduling among data queues with equal priorities.

The scheduling policy that is based on subVL prioritization can include EDF scheduling. The EDF scheduling can include retrieving AFDX data frames from each data queue according to a FIFO order.

The scheduling policy that is based on subVL prioritization can include LLF scheduling. The LLF scheduling can include retrieving AFDX data frames from each data queue according to a first-in-first-out (FIFO) order.

In a further aspect, the inventive concepts disclosed herein are directed to a non-transitory computer-readable medium including computer executable instructions stored thereon. The computer executable instructions, when executed by at least one processor, can cause the at least one processor to obtain AFDX data frames for transmission over a plurality of subVLs of a VL. The computer executable instructions can cause the at least one processor to maintain for each of the plurality of subVLs a corresponding data queue by storing AFDX data frames associated with that subVL in the corresponding data queue. The computer executable instructions can also cause the at least one processor to transmit the AFDX data frames from the plurality of data queues on the plurality subVLs according to a scheduling policy that is based on subVL prioritization.

The scheduling policy that is based on subVL prioritization can include Pn scheduling. The scheduling policy that is based on subVL prioritization can include EDF scheduling. The scheduling policy that is based on subVL prioritization can include LLF scheduling.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

In AFDX networks, a transmit virtual link (TxVL) can be composed of a plurality of subVLs. The Aeronautical Radio, Incorporated (ARINC) 664, part 7 standard defines the scheduling policy for SubVLs within a VL to be according to a round-robin scheme. Each subVL can be associated with a respective queue of data frames. Also, in an AFDX network, each end system can assign a separate bandwidth W to each TxVL handled by that end system. For a VL having multiple subVLs, the end system can divide the bandwidth assigned to the VL among the corresponding subVLs. For instance, if the number of subVLs in the VL is equal to N, the end system can assign a bandwidth equal to $$\frac{W}{N}$$

to each subVL.

Using the round-robin scheme in scheduling transmission of data frames from a plurality of subVLs associated with a respective VL leads to poor flexibility for network designers when trading off latency or jitter and network resources. In particular, the round-robin scheme does not distinguish between different subVLs based, for example, on the priority associated with the data stored in each subVL queue. For instance, when a data frame arrives at an empty subVL queue of a given VL, the time delay to transmit the data frame can be up to N*bandwidth allocation gap (BAG), where N is the total number of subVLs in the VL and BAG represents the time between data frame transmissions from the VL. Specifically, the BAG interval represents the time interval between the beginning of consecutive data frames for a given VL, not considering any jitter time. Jitter is defined as the time interval between the beginning of the BAG interval and the first of the frame to be transmitted. Since the round-robin scheme is cyclic in nature and does not take into account priorities, the time delay depends on the relative location (relative to the empty subVL queue receiving the data frame) of the subVL queue currently served by the end system scheduler.

As an illustrative example, consider a TxVL with two subVLs; subVL A has a 20 Hz periodic frame with latency requirement of 25 milliseconds and subVL B has a 1 Hz burst with 5 frames and no real latency requirement. Ignoring subVL B, the preferred BAG would be 25 milliseconds. However, at the time a frame arrives to subVL A, the subVL currently processed by the scheduler (or the position of the scheduler within the round-robin order) may not be known. Consequently, the BAG value would have to be decreased to 12.5 or less to ensure that a frame can be serviced out of SubVL B and SubVL A in the worst case. Decreasing the BAG value leads to an increase in the bandwidth. Alternatively, the data on SubVL B could be moved off to a separate TxVL. Both solutions result in utilization of more resources, either more VLs or more bandwidth.

To improve (or reduce) latency and bandwidth and resources utilization, some embodiments of the systems and methods described herein employ prioritization-based scheduling policies for scheduling transmission of data frames from multiple subVLs of a VL. Unlike the round-robin scheme where a scheduler retrieves a data frame from each subVL in sequentially cyclic manner and does not account for any prioritization, prioritization-based scheduling policies can be based on subVL prioritization or data prioritization. Different prioritizations may be assigned to separate subVLs or to separate data messages. The scheduler can then retrieve data frames for transmission from subVLs with relatively higher priorities first, or retrieve data frames associated with relatively higher priorities first. Prioritization-based scheduling policies can include SPn scheduling, EDF scheduling, or LLT scheduling. Such priority-based scheduling schemes lead to reduced latency. Latency reduction allows for more data payloads to be scheduled and therefore improved (or reduce) bandwidth usage, for example, compared to when using round-robin scheduling. Most of the latency in AFDX system occurs at the subVLs. By reducing such latency, substantial performance improvements of the system can be achieved, for example, by improving bandwidth and system resources usage.

Figure 1:
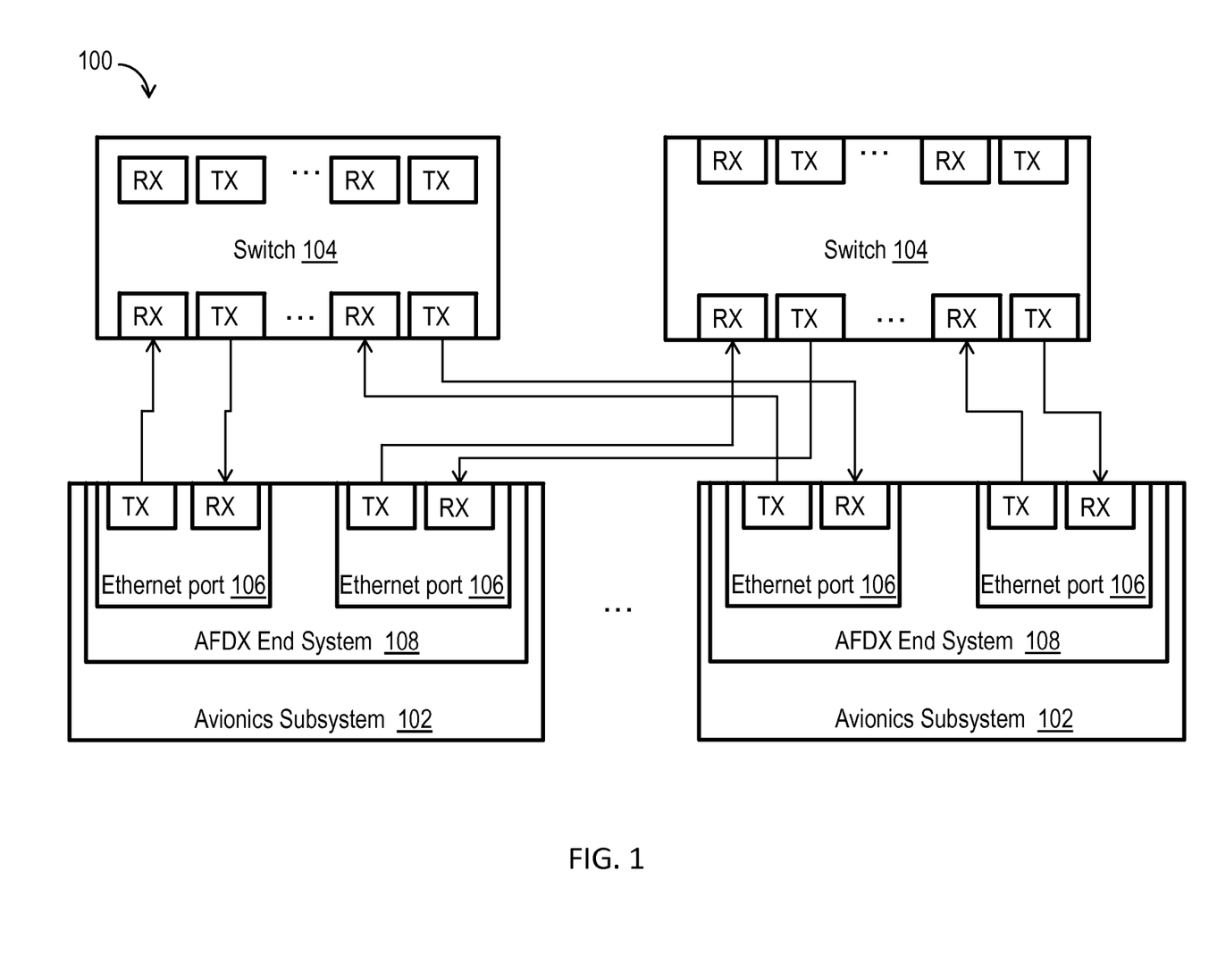
FIG. 1 shows a block diagram illustrating an example embodiment of an AFDX network, according to inventive concepts of this disclosure.

Referring now to the drawings, FIG. 1 shows a block diagram illustrating an example embodiment of an AFDX system 100, according to embodiments of the inventive concepts of this disclosure. The AFDX system 100 can include a plurality of avionics subsystems 102 connected to a plurality of switches 104. Each switch 104 can be configured to route data between various avionics subsystems 102. For instance, each switch 104 can maintain a respective routing table to route data frames (or data packets) between various avionics subsystems 102.

Each avionics subsystem 102 can be an electronic device (or electronic system) fitted to an aircraft to perform a specific function, such as a weather radar, lighting detector, navigation system, traffic alert and collision avoidance system TCAS, ground-proximity warning system (GPWS), black box, a glass cockpit, aircraft flight-control system, the like, or a combination thereof. The electronics systems or devices can exchange data in performing respective functions. For example, the weather radar, the lightning detector, the navigation system, the TCAS or the GPWS may be configured to periodically report measured data or detected events to glass cockpits or the aircraft flight-control system. Considering the typically large number of avionics subsystems 102 in an aircraft, relying on physical links between each pair of avionics subsystems 102 communicating to one another can result in complex wiring. The AFDX system 100 allows for establishing VLs between avionics subsystems 102 communicating to one another.

Each avionics subsystem 102 can include an Ethernet port 106 for transmitting data to, or receiving data from, other avionics subsystems 102. Each Ethernet port 106 can include a transmit port and a receive port, or can include a port acting both as a transmit and a receive port. Each avionics subsystem 102 can include two (or multiple) Ethernet ports 106 to allow for redundant transmission of data. For example, the avionics subsystem 102 can transmit a data frame over two separate transmit ports to be routed over two separate communication routes. For instance, separate Ethernet ports 106 of an avionics subsystem can be connected to separate switches 104, respectively. The redundancy in data transmission allows for resilience against lost data frames (or data packets).

The avionics subsystem 102 can also include an AFDX end system 108 for handling communications with other avionics subsystems 102. Each AFDX end system 108 of an avionics subsystem 102 can establish and handle VLs with other avionics subsystem 102. Each AFDX end system 108 can be viewed as an AFDX communication interface configured to handle communications for the corresponding avionics subsystem 102. The AFDX end system 108 can include a processor (e.g., a central processing unit (CPU), a microprocessor, a digital signal processor (DSP), multi-core processor, a network processor, or the like) and a memory for maintaining data queues of data frames (or data packets), or storing computer code instructions to be executed by the processor. The computer code instructions, when executed by the processor, can cause the processor to schedule data frames for transmission and transmit the data frames according a scheduling scheme. The processor can also establish VLs with other avionics subsystems 102, and handle data transmission (or data reception) over the established VLs.

A TxVL can include a plurality of subVLs, such as 2, 3, 4, or any other number of subVLs. In such case, the AFDX subsystem 108 (or the respective processor) controlling that TxVL can maintain a separate data queue for each of the subVLs, and schedule data frames transmission from the subVLs according to a scheduling scheme. The computer code instructions can include an implementation of a prioritization-based scheduling scheme, such as SPn, EDF, or LLF, for processing data frames from various subVLs of a given TxVL. The processor, when executing the computer code instructions, can retrieve data frames from the various subVLs for transmission, according to the implemented prioritization-based scheduling scheme.

Figure 2:
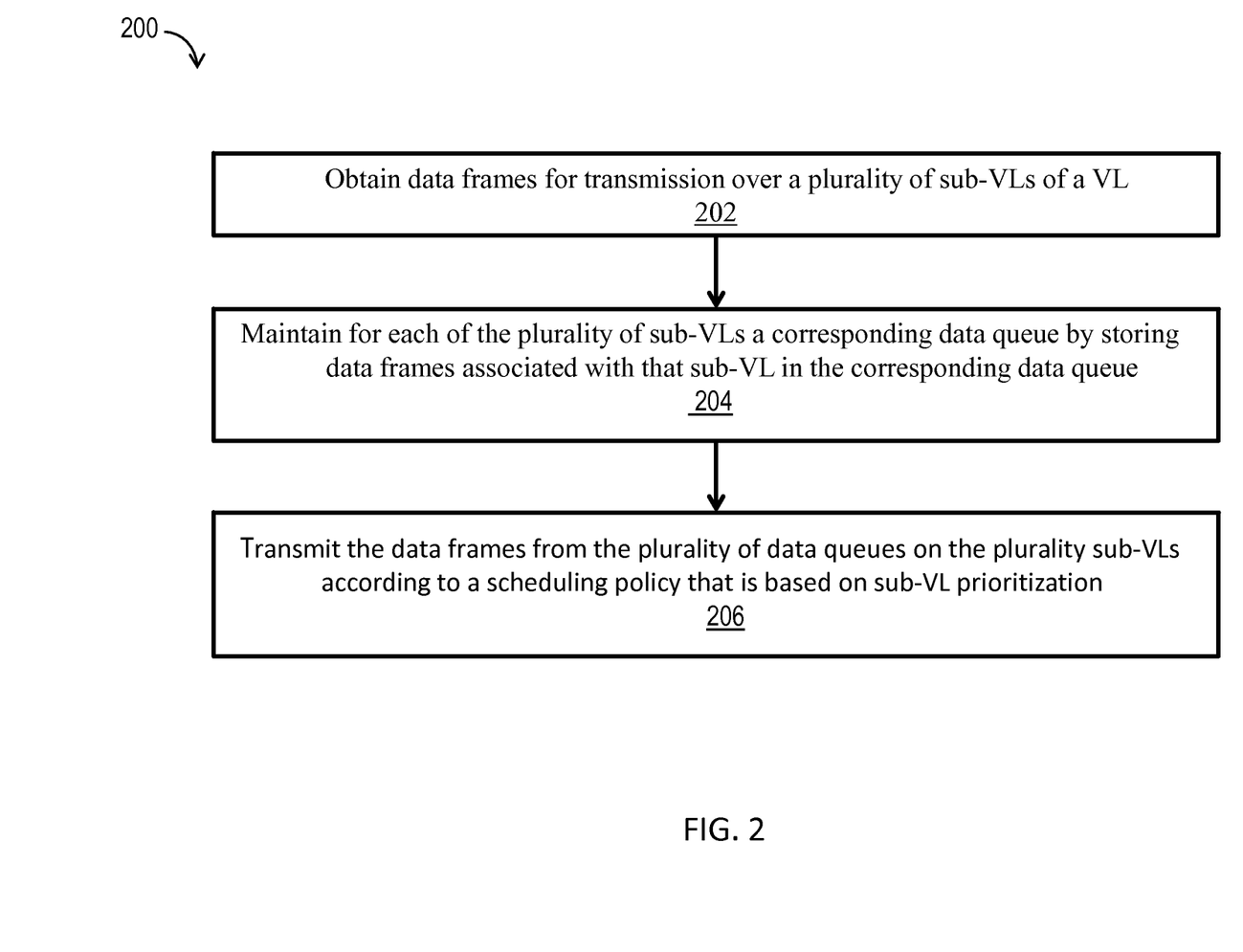
FIG. 2 shows a flowchart illustrating an example embodiment of a method of scheduling and transmitting AFDX data from a plurality of subVLs associated with a common VL, according to inventive concepts of this disclosure.

Referring to FIG. 2, a flowchart illustrates an example embodiment of a method 200 of scheduling and transmitting AFDX data from a plurality of subVLs associated with a common VL, according to inventive concepts of this disclosure. The method 200 can include obtaining AFDX data frames for transmission over a plurality of subVLs of a VL (step 202). The method 200 can include maintaining for each of the plurality of subVLs a corresponding data queue by storing AFDX data frames associated with that subVL in the corresponding data queue (step 204), and transmitting the AFDX data frames from the plurality of data queues of the plurality subVLs according to a scheduling policy that is based on subVL prioritization (step 206).

The method 200 can include obtaining (or receiving) AFDX data frames for transmission over a plurality of subVLs of a VL (step 202). The data frames (or data packets) can include user datagram protocol (UDP) data frames, transport control protocol (TCP) data frames, data frames generated according Internet protocol (IP) fragmentation, or other types of data segments. The AFDX end system 108 can receive data frames from the corresponding avionics system 102. Each data frame can be associated with a respective data message or datagram. Each data message or datagram can include one or more data frames. Each subVL of the plurality of subVLs may be designated to carry data frames associated with one or more specific messages, or one or more categories of data messages. The data frames or the corresponding data messages (or datagrams) can include data related to measured parameters (e.g., measurements of weather conditions such as temperature, wind speed, humidity, etc., measurements of equipment parameters such as engine parameters, electric circuits parameters, or the like), alerts (e.g., associated with detected events such as lightening, or malfunction of some aircraft equipment), or other communication data.

The method 200 can include maintaining for each of the plurality of subVLs a corresponding data queue by storing AFDX data frames associated with that subVL in the corresponding data queue (step 204). The processor of the avionics subsystem 102 (or the corresponding AFDX end system 108) can maintain for each subVL of the plurality of subVLs a corresponding first-in-first out (FIFO) queue. The processor store each received data frame in the queue of the corresponding subVL. For example, if a subVL is designated or configured to carry data frames associated with a given message type or a given message category, the processor can store received data frames associated with the given message type or the given message category in the queue of that subVL. Maintaining a FIFO queue for each subVL can include the processor maintaining or keeping track of the order according to which stored data frames in each queue were received to enforce FIFO processing.

The method 200 can include transmitting the AFDX data frames from the plurality of data queues of the plurality subVLs according to a prioritization-based scheduling policy that is based on subVL prioritization or data prioritization (step 206). The processor can retrieve data frames from the maintained queues according to the prioritization-based scheduling policy for transmission over the respective subVLs. The prioritization-based scheduling policy can include static priority (SPn) scheduling, earliest deadline first (EDF) scheduling, or least laxity first (LLF) scheduling.

A static priority (SPn) scheduler can process a single data frame per scheduler epoch (e.g., BAG interval). For each queue associated with a corresponding subVL, the scheduler (or the processor) can process data frames of that queue according to a FIFO scheme. The subVLs or respective queues can be assigned (or associated with) separate priority values, and the scheduler (or the processor) can serve the queues (retrieves data frames from the queues) based on the respective priorities. In particular, the scheduler (or the processor) can serve the queue associated with the highest priority first by retrieving and transmitting all data frames in that queue, followed by the queue associated with the next highest priority, and so on and so forth. If two (or a subset of) queues are associated with equal priorities, then the order of serving such queues follows a round-robin scheme.

Figure 3:
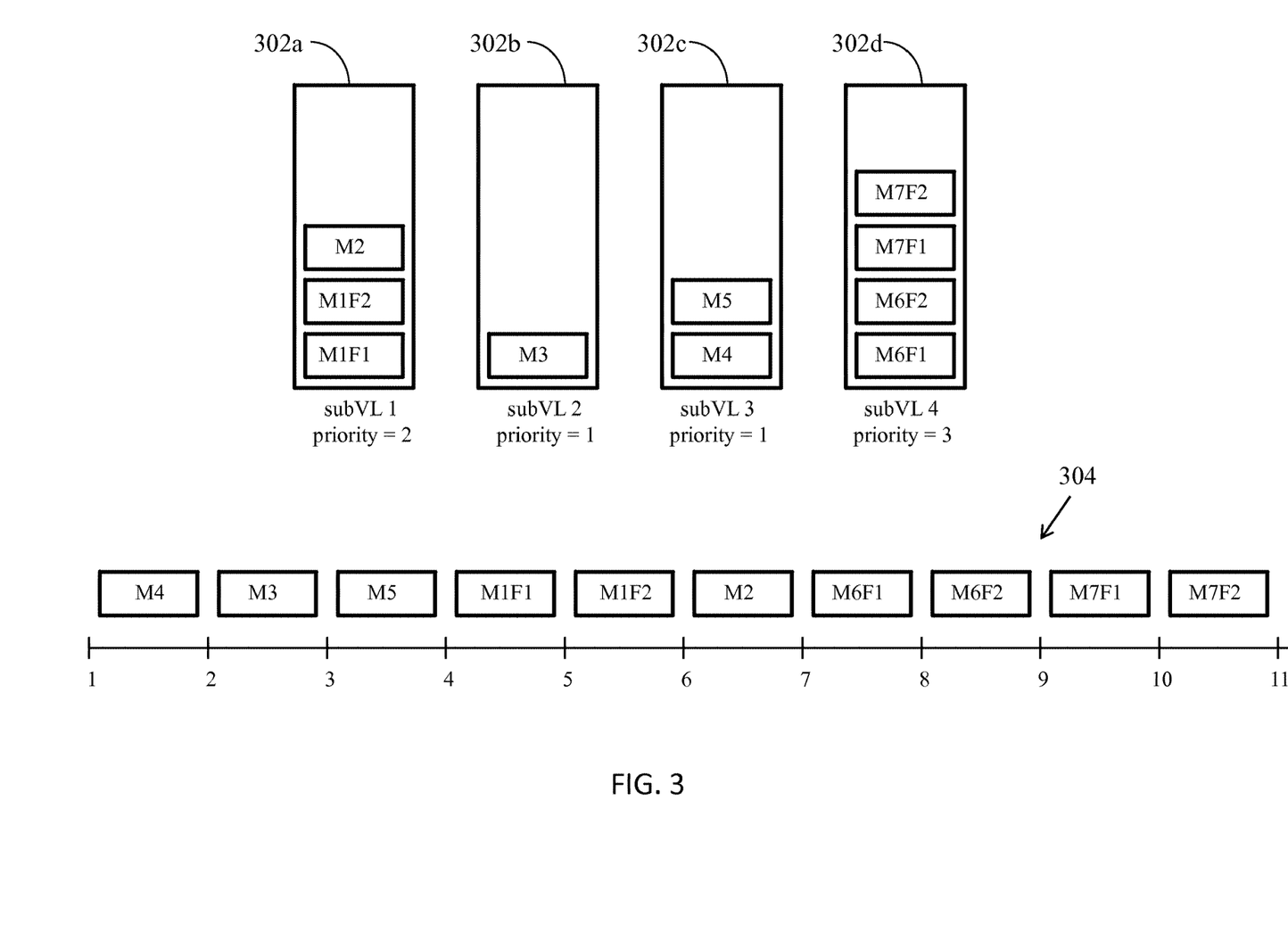
FIG. 3 shows a diagram illustrating an example embodiment of SPn scheduling of data frames from a plurality of subVLs associated with a common VL, according to inventive concepts of this disclosure.

Referring to FIG. 3, a diagram illustrating an example embodiment of static priority (SPn) scheduling of data frames from a plurality of subVLs associated with a common VL is shown, according to embodiments of inventive concepts of this disclosure. The VL includes four subVLs; subVL 1, subVL 2, subVL 3, and subVL 4. This number of subVLs is provided for illustrative purpose and is not to be interpreted as restrictive or limiting in any way. In general, the VL can have some other number of subVLs, such as 2, 3, 5, or other number. Four queues 302a-302d are associated with subVL 1, subVL 2, subVL 3, and subVL 4, respectively.

SubVL 1 has a priority value equal to 2, subVL 2 has a priority value equal to 1, subVL 3 has a priority value equal to 1, and subVL 4 has a priority value equal to 3, for instance. Here, the lower the priority value, the higher is the priority. For example, subVLs 2 and 3 have the highest priorities (priority value equal to 1) and subVL 4 has the lowest priority (priority value equal to 3). Some subVLs may be designated to carry data with relatively higher importance or lower latency than other subVLs. The processor can assign, to a subVL carrying data associated with relatively higher importance or relatively lower latency (compared to one or more other subVLs), a higher priority than the one or more other subVLs. In some implementations, the priority of each subVL can be predefined.

By way of illustration, queue 302a corresponding to subVL 1 can include data frames M1F1 and M1F2 associated with Message 1 and the data frame M2 associated with Message 2. Queue 302b corresponding to subVL 2 can include data frame M3 associated with Message 3. Queue 302c corresponding to subVL 3 can include data frame M4 associated with Message 4 and data frame M5 associated with Message 5. Queue 302d corresponding to subVL 4 can include data frames M6F1 and M6F2 associated with Message 6, and data frames M7F1 and M7F2 associated with Message 7. The transmission scheme 304 illustrates the order according to which the SPn scheduler (or the processor) retrieves, from the queues 302a-302d, and transmits the data frames.

Considering the priority values associated with the subVLs 1-4 or the corresponding queues 302a-302d, the queues 302b and 302c associated with the subVLs 2 and 3 have the highest (and the same) priority. As such, the scheduler (or the processor) can serve both queues 302b and 302c first according to a round-robin scheme. As illustrated in the transmission scheme 304, the scheduler (or the processor) alternates between the queues 302b and 302c retrieving a single data frame from one of these queues at each epoch (or BAG interval) until both queues are empty. For instance, the scheduler or the processor can retrieve and transmit data frame M4 from queue 302c, followed by data frame M3 from queue 302b, followed by data frame M5 from queue 302c. Note that for each of these queues, the respective data frames are retrieved according to a FIFO order. Once queues 302b and 302c associated with the highest-priority subVLs 2 and 3, the scheduler serves queue 302a associated with next highest priority. Accordingly, the scheduler (or the processor) retrieves the data frames M1F1, M1F2, and M2 from queue 302a according to a FIFO order, and transmits the data frames M1F1, M1F2, and M2 in the epochs numbered 4, 5, and 6, respectively. Once queue 302a is empty, the scheduler (or the processor) serves queue 302d of subVL 4 associated with the lowest priority, and retrieves the data frames M6F1, M6F2, M7F1, and M7F2 according to a FIFO order to be transmitted in the epochs numbered 7-10, respectively.

To assess the performance of SPn scheduling compared to the round-robin scheme, a real world dataset from an avionics network is simulated. The dataset includes approximately 4400 Tx ports with a message size, an transmit interval, and a subVL index defined for each Tx port. Each of the Tx ports is associated with one of approximately 2400 SubVLs. As such, a given subVL can be associated with multiple Tx ports. In particular, a subVL is associated with a FIFO memory queue that can be shared between multiple Tx ports. Each of the SubVLs is associated with one of approximately 1500 VLs. For each subVL, a respective subVL index and a VL identifier are defined. Each VL has a defined BAG value and a maximum transmission unit (MTU) (or maximum frame size). Using the dataset, the worst case latency of each Tx port is computed for round-robin and SPn scheduling of the SubVLs. In the simulations, we assume that each of the Tx ports sends its maximum amount of data.

The latency is computed as the amount of time between the time instance at which data is offered on the respective Tx port and the time instance at which the data is transmitted over the corresponding VL. As defined, the latency factors in only the delay through the subVL/VL queues. For round-robin scheduling, the latency is computed as Delay=Frame Burst*N*BAG, where Frame Burst represents the worst case quantity of frames for all Tx ports that share the same Sub VL, N is the number of subVLs for the corresponding VL, and BAG is the assigned BAG for that VL. This equation for the latency assumes that each subVL is consuming 1/N of the bandwidth of the VL.

For SPn scheduling, the latency is computed by first assigning priorities to the various subVL queues and then performing the worst case calculation. Priorities are assigned to the given subVL queues within a VL based on the previously computed latencies for round-robin scheduling. In particular, a subVL with a lower latency (compared to one or more other subVLs) is assigned a higher priority (than the one or more other subVLs). The latency is defined as Delay=(Frame Burst+Lower Priority Delay Adder)/(1/BAG−Higher Priority Frame Rate). The Frame Burst represents the worst case quantity of frames for all Tx ports that share the same subVL. The Lower Priority Delay Adder parameter is equal to 1 if a lower priority to the subVL being processed exists, or 0 if not to account for a lower priority frame could have just been scheduled. The Lower Priority Delay Adder parameter is used to account for the delay that could occur if a lower priority subVL queue transmitted data just prior to a higher priority queue got data. This would mean that the higher priority queue would have to wait at least a BAG cycle. If there is no lower priority subVL queue than the one being processed, then there is no queue that can cause an extra delay beyond the worst case burst for the subVL queue. BAG is the assigned BAG value for the VL and the Higher Priority Frame Rate parameter is the summation of frame rates for the higher priority subVL queues in the same VL. For a given subVL, the frame rate is calculated by (i) calculating the number of frames per message (e.g., message size/MTU), (ii) calculating the Tx port frame rate (e.g., number of frames per message/transmit interval), (iii) calculating the subVL frame rate as the summation of Tx port frame rates for all Tx ports associated with a given subVL, (iv) and calculating the Higher Priority Frame Rate for a given subVL as the sum the frame rates for each subVL of higher priority on the same VL.

For the entire dataset, the average worst case latency decreases from 185.3 to 149.9 milliseconds when using SPn scheduling instead of round-robin scheduling, with an average improvement of 35.5 milliseconds. For Tx ports associated with VLs with more than one subVL, the average worst case latency decreases when using SPn scheduling instead of round-robin scheduling from 209.2 to 158 milliseconds for an average improvement of 51.1 milliseconds. This is a significant improvement, especially when considering the VLs with more than one SubVL. (Note: Prioritization has no effect on VLs with a single SubVL.) Considering all VLs of the dataset, 51.1% of the total VLs have better performance when using SPn scheduling, 42.5% of the total VLs have the same performance for SPn and round-robin scheduling, and 6.4% of the total VLs have a worse performance with SPn scheduling than with round-robin scheduling. When considering only VLs having more than one subVL, 73.7% of these VLs performed better with SPn scheduling, 9.2% of the VLs have a performance worse that that with round-robin scheduling, and 17.1% of the VLs have the same performance for both SPn and round-robin scheduling.

An earliest deadline first (EDF) scheduler can process a single data frame per scheduler epoch (e.g., BAG interval). For each queue associated with a corresponding subVL, the scheduler (or the processor) can process (e.g., retrieve and transmit) data frames of that queue according to a FIFO scheme. In an EDF scheduling scheme, each message (or datagram) can have a respective deadline value. The deadline value is defined as the sum of the time of arrival of that message and a configured maximum age for that message. The configured maximum age can be viewed as the maximum waiting time for that message in the queue before transmission. For each message the respective time to deadline is defined as the deadline for that message minus the age of that message, where the age of the message is defined as the current time minus the time of arrival of the message. The EDF scheduler (or the processor in an EDF scheduling scheme) can prioritize data frames of messages associated with the earliest deadline (or smallest time to deadline). By prioritizing messages (or respective data frames) associated with the earliest deadline, the scheduler (or the processor) can prevent messages or respective data frames from exceeding respective deadlines in the queues. Accordingly, the scheduler can maintain a relatively smaller latency, for example, compared to a round-robin scheduling scheme. Reducing latency leads to improved bandwidth usage as it allows for scheduling and transmitting more data payloads.

Figure 4:
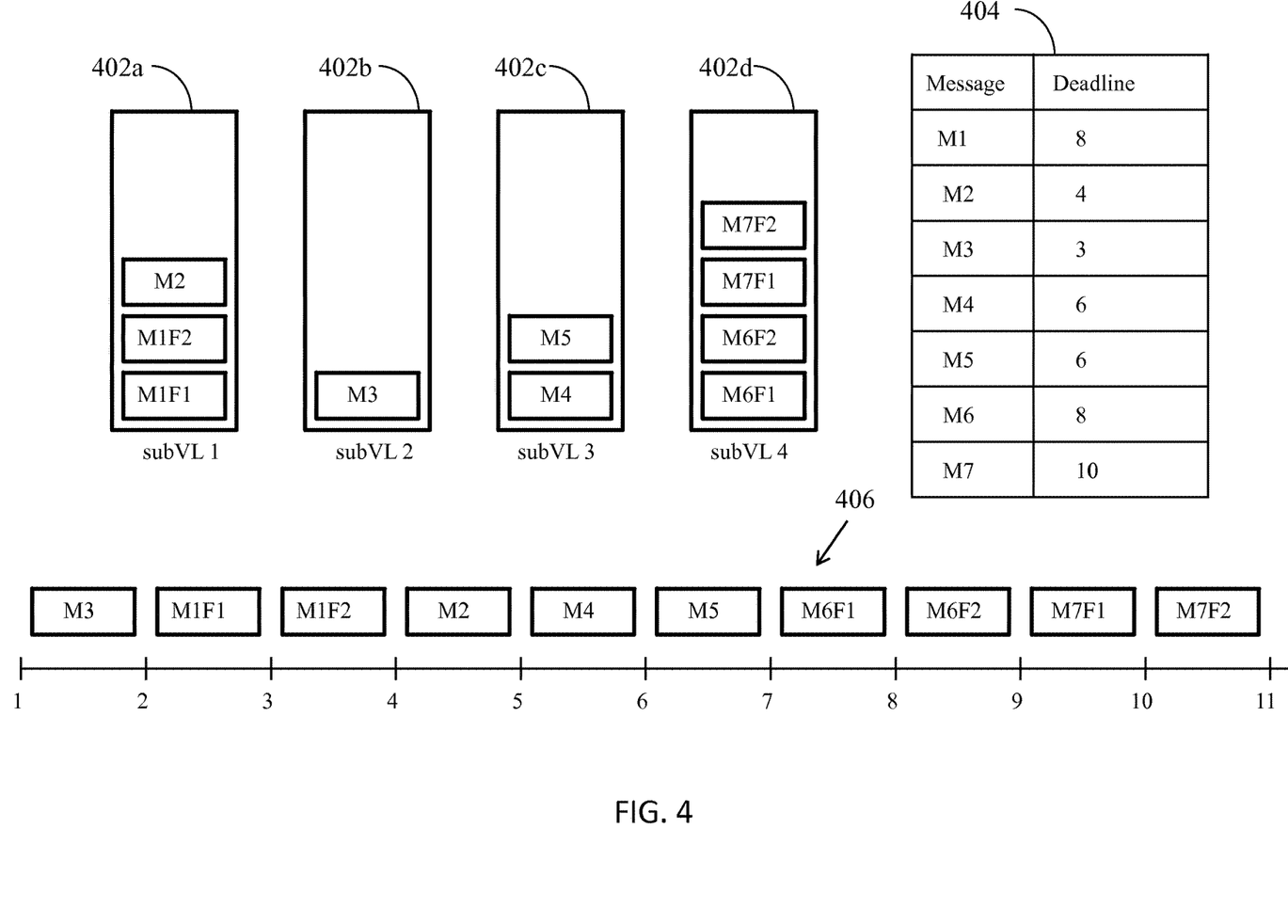
FIG. 4 shows a diagram illustrating an example embodiment of EDF scheduling of data frames from a plurality of subVLs associated with a common VL, according to inventive concepts of this disclosure.

Referring to FIG. 4, a diagram illustrating an example embodiment of EDF scheduling of data frames from a plurality of subVLs associated with a common VL is shown, according to inventive concepts of this disclosure. Similar to FIG. 3, the VL includes four subVLs; subVL 1, subVL 2, subVL 3, and subVL 4, associated with queues 402a-402d, respectively. The number of subVLs is provided for illustrative purpose and is not to be interpreted as restrictive or limiting in any way. In general, the VL can be some other number of subVLs, such as 2, 3, 5, or other number. Queues 402a-402d include similar data frames as queues 302a-302d, respectively. The deadline for the messages M1-M7 are equal to 8, 4, 3, 6, 6, 8, and 10, respectively, as illustrated in the list 404. Assuming that all data frames have just arrived (zero age), the deadline is equal to time to deadline at epoch 1 (or BAG 1). The transmission scheme 406 illustrates the order of retrieving and transmitting the data frames in the queues 402a-402d according to the EDF scheduling scheme.

Since Message 3 has the earliest deadline, the EDF scheduler (or the processor) retrieves the corresponding data frame M3 first from queue 402b and transmits the data frame M3 during epoch 1 (or BAG interval 1). Message 2 in queue 402a has the next earliest deadline. However, the corresponding data frame M2 arrived after frames M1F1 and M1F2 to queue 402a. Since data frames from a given queue are processed according to a FIFO order, the EDF scheduler (or the processor) retrieves data frames M1F1 and M1F2 and then data frame M2 from queue 402a. The EDF scheduler (or the processor) causes the data frames M1F1, M1F2 and M2 to be transmitted during epochs 2-4, respectively. Messages 4 and 5 has the next earliest deadline. The corresponding data frames M4 and M5 are located in queue 402c of subVL 3. Since data frames in any queue are to be retrieved according to a FIFO order, the EDF scheduler (or the processor) can retrieve data frame M4 and then data frame M5 from queue 402c, and cause the data frames M4 and M5 to be transmitted during epochs 5 and 6, respectively. Messages 6 and 1 have the next earliest deadline. However, the data frames M1F1 and M1F2 associated with Message 1 were already processed. So the EDF scheduler (or the processor) can retrieve data frames M6F1 and M6F2 associated with Message 6 from queue 402d, and cause the data frames M6F1 and M6F2 to be transmitted during epochs 7 and 8, respectively. Finally, the EDF scheduler can retrieve data frames M7F1 and M7F2 of Message 7 (associated with the largest time to deadline) from queue 402d, and cause the data frames M7F1 and M7F2 to be transmitted during epochs 9 and 10, respectively.

A least laxity first (LLF) scheduler can process a single data frame per scheduler epoch (e.g., BAG interval). For each queue associated with a corresponding subVL, the LLF scheduler (or the processor) can process (e.g., retrieve and transmit) data frames of that queue according to a FIFO scheme. In a LLF scheduling scheme, each message (or datagram) can have a respective deadline value and a respective time to deadline defined similarly as for the EDF scheduling scheme. Also, for each message, a respective work value is defined as the sum of the time to serve data frames ahead of the message and the time to serve the data frames in the message. The LLF scheduler (or the processor in an LLF scheduling scheme) can prioritize data frames of messages associated with the least laxity where the laxity for each message is defined as: laxity=deadline−age−work. By prioritizing messages (or respective data frames) associated with the least laxity, the scheduler (or the processor) takes into account the amount of work to serve a given message to prevent messages or respective data frames from exceeding respective deadlines in the queues. Accordingly, the scheduler can maintain a relatively smaller latency, for example, compared to a round-robin scheduling scheme, and, therefore improve bandwidth usage.

Figure 5:
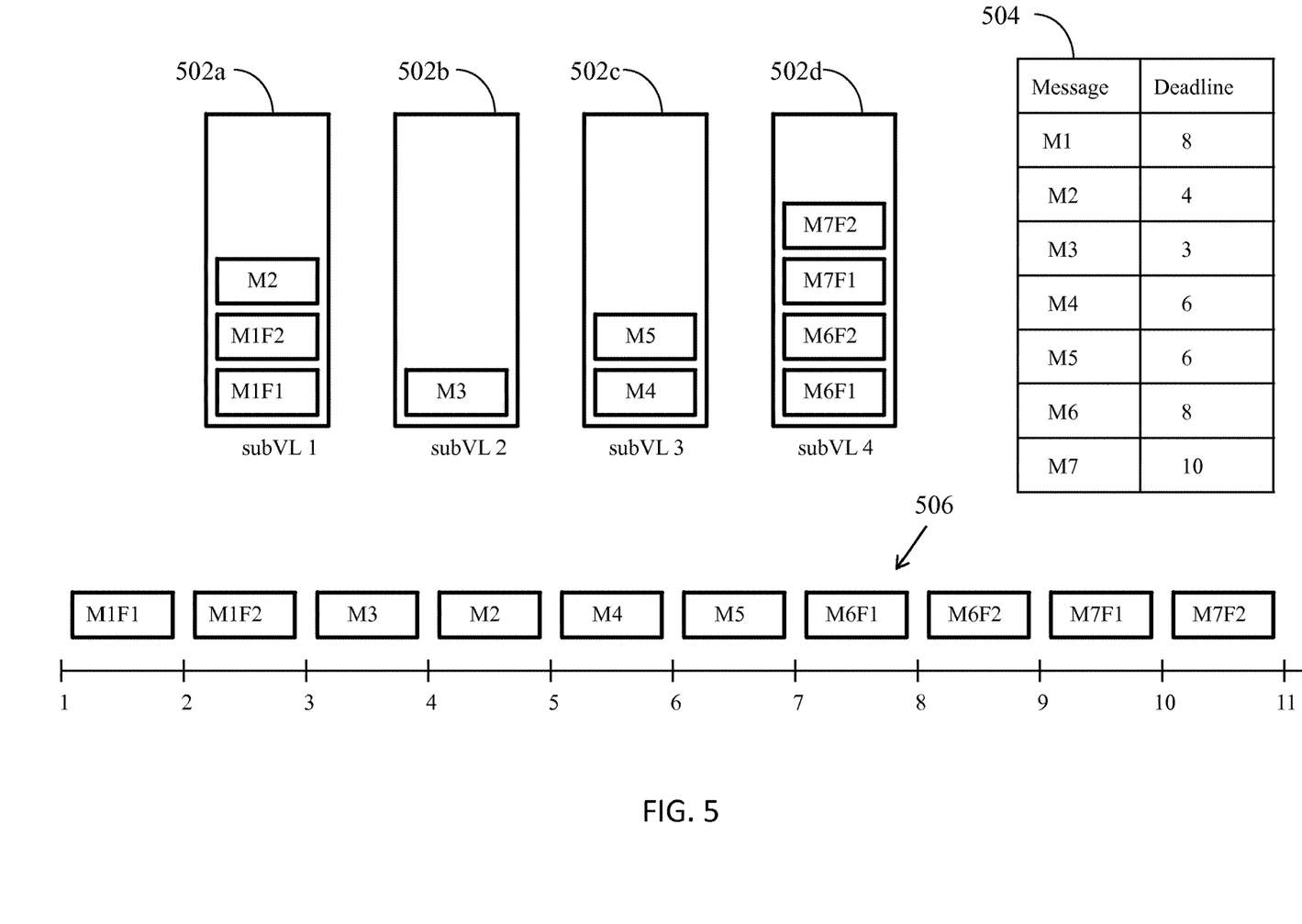
FIG. 5 shows a diagram illustrating an example embodiment of LLF scheduling of data frames from a plurality of subVLs associated with a common VL, according to inventive concepts of this disclosure.

Referring to FIG. 5, a diagram illustrating an example embodiment of LLF scheduling of data frames from a plurality of subVLs associated with a common VL is shown, according to inventive concepts of this disclosure. The VL includes four subVLs; subVL 1, subVL 2, subVL 3, and subVL 4, associated with queues 502a-502d, respectively, similar to FIG. 4. The number of subVLs is provided for illustrative purpose and is not to be interpreted as restrictive. In general, the VL can have another number of subVLs, such as 2, 3, 5, or some other number. Queues 502a-502d include similar data frames as queues 402a-402d, respectively, and the time to deadline, shown in list 504, for the messages M1-M7 are equal to 8, 4, 3, 6, 6, 8, and 10, respectively, similar to FIG. 4. The transmission scheme 506 illustrates the order of retrieving and transmitting the data frames in the queues 502a-502d according to the LLF scheduling scheme.

Table 1 below shows the calculated slack for each of the messages M1-M7 at epoch 1. All the data frames are assumed to have just arrived at the respective queues with an age equal to 0 for all messages M1-M7. The amount of work for a given message is computed by adding the time to process the frames ahead of the message in the corresponding queue and the time to process the frames of the message. For example, for message M2, there are two frames M1F1 and M1F2 ahead in queue 502a that each consumes 1 epoch to be processed. Also, message M2 has a single data frame M2 that consumes 1 epoch to be processed. The laxity for each message is computed by subtracting the age and work of the message from the deadline of the message. Based on the calculation results in Table 1, message M2 has the smallest slack (equal to 1). Since data frames M1F1 and M1F2 are ahead of M2, the LLF scheduler (or the processor) can retrieve the data frame M1F1 (according to FIFO processing order), and cause the data frame M1F1 to be transmitted during epoch 1.

TABLE 1

| Message | Deadline | Age | Work | Slack |
|---------|----------|-----|------|-------|
| M1 | 8 | 0 | 3 | 6 |
| M2 | 4 | 0 | 3 | 1 |
| M3 | 3 | 0 | 1 | 2 |
| M4 | 6 | 0 | 1 | 5 |
| M5 | 6 | 0 | 2 | 4 |
| M6 | 8 | 0 | 2 | 6 |
| M7 | 10 | 0 | 4 | 6 |

At epoch 2, the LLF scheduler re-computes the laxity values for the messages based on the remaining data frames. Note that at this point, data frame M1F1 was already processed. Also, all messages aged after 1 epoch was consumed in serving data frame M1F1. Based on the computed results in Table 2, M2 and M3 have the smallest laxity (equal to 1) at epoch 2. The LLF scheduler (or the processor) can select either M2 or M3 at epoch 2. Assuming that the LLF scheduler (or the processor) selected data frame M2, then the LLF scheduler (or the processor) can retrieve data frame M1F2 which is ahead of M2 in queue 502a, and cause data frame M1F2 to be transmitted during epoch 2.

TABLE 2

| Message | Deadline | Age | Work | Slack |
|---------|----------|-----|------|-------|
| M1 | 8 | 1 | 1 | 6 |
| M2 | 4 | 1 | 2 | 1 |
| M3 | 3 | 1 | 1 | 1 |
| M4 | 6 | 1 | 1 | 4 |
| M5 | 6 | 1 | 2 | 3 |
| M6 | 8 | 1 | 2 | 5 |
| M7 | 10 | 1 | 4 | 5 |

At epoch 3, the LLF scheduler can re-compute the laxity values for the messages based on the remaining data frames. Note that at this point, data frames M1F1 and M1F2 were already processed. Also, all messages aged after 2 epochs were consumed in serving data frames M1F1 and M1F2. Based on the computed results in Table 3, M3 has the smallest laxity (equal to 0) at epoch 3. The LLF scheduler can retrieve data frame M3 from queue 502b and transmit it at epoch 3.

TABLE 3

| Message | Deadline | Age | Work | Slack |
|---------|----------|-----|------|-------|
| M1 | served | served | served | served |
| M2 | 4 | 2 | 1 | 1 |
| M3 | 3 | 2 | 1 | 0 |
| M4 | 6 | 2 | 1 | 3 |
| M5 | 6 | 2 | 2 | 2 |
| M6 | 8 | 2 | 2 | 4 |
| M7 | 10 | 2 | 4 | 4 |

At epoch 4, the LLF scheduler (or the processor) can re-compute the laxity values for the messages based on the remaining data frames. Note that at this point, data frames M1F1, M1F2, and M3 were already processed. Also, all messages aged after 3 epochs were consumed in serving data frames M1F1, M1F2, and M3. Based on the computed laxity values in Table 4, M2 has the smallest laxity (equal to 0) at epoch 4. The LLF scheduler (or the processor) can retrieve data frame M2 from queue 502a and transmit it at epoch 4.

TABLE 4

| Message | Deadline | Age | Work | Slack |
|---------|----------|-----|------|-------|
| M1 | served | served | served | served |
| M2 | 4 | 3 | 1 | 0 |
| M3 | served | served | served | served |
| M4 | 6 | 3 | 1 | 2 |
| M5 | 6 | 3 | 2 | 1 |
| M6 | 8 | 3 | 2 | 3 |
| M7 | 10 | 3 | 4 | 3 |

Continuing the same process by computing the laxity values at each epoch (or BAG interval), the LLF scheduler (or the processor) can retrieve and transmit data frames M4, M5, M6F1, M6F2, M7F1, and M7F2 at epochs 5-10, respectively.

While embodiments disclosed herein listed and described SPn, EDF and LLF scheduling schemes, a person skilled in the art would appreciate that other priority-based scheduling schemes can be anticipated. Also, as used herein, a scheduling policy that is based on subVL prioritization can include scheduling schemes with priorities assigned to (or associated with) subVLs (e.g., SPn scheduling) as well as scheduling schemes with priorities assigned to (or associated with) data messages (e.g., EDF or LLF scheduling). The embodiments described herein can be implemented as hardware, firmware, software, or a combination thereof. For instance, such embodiments can be implemented using computer-executable instructions stored on a non-transitory computer-readable medium.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A device for avionics full-duplex switched Ethernet (AFDX) communication, the device comprising:
    one or more transmit ports for transmitting AFDX data;
    a memory for storing data; and
    a processor configured to:
        obtain AFDX data frames for transmission over a plurality of sub-virtual links (subVLs) of a virtual link (VL), the AFDX data frames generated according to a communication protocol;

maintain, for each subVL of the plurality of subVLs, a corresponding data queue in the memory for storing a subset of the AFDX data frames for transmission over the subVL; and transmit the AFDX data frames from the plurality of data queues on the plurality of subVLs via the one or more transmit ports according to an earliest deadline first (EDF) scheduling scheme, the EDF scheduling scheme assigning distinct deadlines to the AFDX data frames stored in the corresponding data queues and prioritizing, at each scheduler epoch of a plurality of scheduler epochs, an AFDX data frame having an earliest deadline for transmission.

2. The device of claim 1, wherein transmitting the AFDX data frames according to the EDF scheduling scheme includes:

identifying, at each scheduler epoch of the plurality of scheduler epochs, the AFDX data frame having the earliest deadline and a respective data queue; and transmitting the identified AFDX data frame and any AFDX data frames ahead of the identified AFDX data frame in the respective data queue.

3. The device of claim 1, wherein the EDF scheduling scheme includes maintaining for each AFDX data frame a respective deadline.

4. A method for transmission of avionics full-duplex switched Ethernet (AFDX) data, the method comprising:

obtaining, by a communication device, AFDX data frames for transmission over a plurality of sub-virtual links (subVLs) of a virtual link (VL), the AFDX data frames generated according to a communication protocol;

maintaining, by the communication device, for each subVL of the plurality of subVLs, a corresponding data queue for storing a subset of the AFDX data frames for transmission over the subVL in the corresponding data queue; and transmitting, by the communication device, the plurality of AFDX data frames from the plurality of data queues on the plurality of subVLs according to an earliest deadline first (EDF) scheduling scheme, the EDF scheduling scheme assigning distinct deadlines to the AFDX data frames stored in the corresponding data queues and prioritizing, at each scheduler epoch of a plurality of scheduler epochs, an AFDX data frame having an earliest deadline for transmission.

5. The method of claim 4, wherein transmitting the AFDX data frames according to the EDF scheduling scheme includes:

identifying, at each scheduler epoch of the plurality of scheduler epochs, the AFDX data frame having the earliest deadline and a respective data queue; and transmitting the identified AFDX data frame and any AFDX data frames ahead of the identified AFDX data frame in the respective data queue.

6. The method of claim 4, wherein the EDF scheduling scheme includes maintaining for each AFDX data frame a respective deadline.

7. A non-transitory computer readable medium including computer executable instructions stored thereon, the computer executable instructions, when executed by at least one processor, cause the at least one processor to:

obtain avionics full-duplex switched Ethernet (AFDX) data frames for transmission over a plurality of sub-virtual links (subVLs) of a virtual link (VL), the AFDX data frames generated according to a communication protocol;

maintain, for each subVL of the plurality of subVLs, a corresponding data queue for storing a subset of the AFDX data frames for transmission over the subVL; and transmit the plurality of AFDX data frames from the plurality of data queues on the plurality of subVLs according to a static priority (SPn) an earliest deadline first (EDF) scheduling scheme, the EDF scheduling scheme assigning distinct deadlines to the AFDX data frames stored in the corresponding data queues and prioritizing, at each scheduler epoch of a plurality of scheduler epochs, an AFDX data frame having an earliest deadline for transmission.

8. The non-transitory computer readable medium of claim 7, wherein transmitting the AFDX data frames according to the EDF the scheduling scheme includes:

identifying, at each scheduler epoch of the plurality of scheduler epochs, the AFDX data frame having the earliest deadline and a respective data queue; and transmitting the identified AFDX data frame and any AFDX data frames ahead of the identified AFDX data frame in the respective data queue.

9. The non-transitory computer readable medium of claim 7, wherein the plurality of subVLs represent all subVLs of the VL.

10. The device of claim 1, wherein the plurality of subVLs represent all subVLs of the VL.

11. The method of claim 4, wherein the plurality of subVLs represent all subVLs of the VL.

12. The device of claim 1, wherein the subset of AFDX data frames is associated with a plurality of messages.

13. The device of claim 1, wherein the subset of AFDX data frames is retrieved from the corresponding data queue according to a first in first out (FIFO) order.

14. The method of claim 4, wherein the subset of AFDX data frames is associated with a plurality of messages.

15. The method of claim 4, wherein the subset of AFDX data frames is retrieved from the corresponding data queue according to a first in first out (FIFO) order.

16. The non-transitory computer readable medium of claim 7, wherein the subset of AFDX data frames is associated with a plurality of messages.

17. The non-transitory computer readable medium of claim 7, wherein the subset of AFDX data frames is retrieved from the corresponding data queue according to a first in first out (FIFO) order.

* * * * *